(12) United States Patent
Oestreich

(10) Patent No.: US 6,349,197 B1
(45) Date of Patent: Feb. 19, 2002

(54) METHOD AND RADIO COMMUNICATION SYSTEM FOR TRANSMITTING SPEECH INFORMATION USING A BROADBAND OR A NARROWBAND SPEECH CODING METHOD DEPENDING ON TRANSMISSION POSSIBILITIES

(75) Inventor: Stefan Oestreich, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/245,619

(22) Filed: Feb. 5, 1999

(30) Foreign Application Priority Data

Feb. 5, 1998 (DE) .......................................... 198 04 581

(51) Int. Cl.[7] .............................. H04B 1/10; H04J 3/22
(52) U.S. Cl. ...................... 455/63; 455/517; 455/423; 370/468
(58) Field of Search ........................ 455/63, 424, 425, 455/423, 517, 501, 403, 560, 561; 370/468, 235, 332, 333

(56) References Cited

U.S. PATENT DOCUMENTS

| | | | | |
|---|---|---|---|---|
| 5,327,576 A | * | 7/1994 | Uddenfeldt et al. | ........ 370/333 |
| 5,701,294 A | * | 12/1997 | Ward et al. | ................ 455/67.1 |
| 5,768,314 A | * | 6/1998 | Kapadia et al. | ............. 375/242 |
| 5,940,439 A | * | 8/1999 | Kleider et al. | ............. 455/67.1 |
| 5,953,666 A | * | 9/1999 | Lehtimäki | .................... 455/439 |
| 5,991,716 A | * | 11/1999 | Lehtimäki | .................... 704/212 |
| 6,108,560 A | * | 8/2000 | Navaro et al. | ............... 455/561 |
| 6,125,120 A | * | 9/2000 | Lehtimäki | .................... 370/435 |
| 6,134,220 A | * | 10/2000 | Le Strat et al. | ............. 370/468 |
| 6,138,020 A | * | 10/2000 | Galyas et al. | ............... 455/561 |

FOREIGN PATENT DOCUMENTS

| | | | |
|---|---|---|---|
| DE | 44 16 407 | 11/1995 | ............ H04Q/7/20 |
| DE | 196 47 630 | 5/1998 | ............ H04Q/7/20 |
| EP | 0 472 511 | 2/1992 | ............ H04Q/7/04 |
| GB | 2 287 381 | 9/1995 | ............ H04Q/7/38 |
| GB | 2 290 201 | 12/1995 | ........... H04L/25/00 |
| WO | 98/48580 | 10/1998 | ............ H04Q/7/20 |

OTHER PUBLICATIONS

J. Biala, "Mobilfunk and intelligente Netze," Vieweg Verlag, 1995, 96–102.
Abe, M. et al, "More Natural Sounding Voice Quality Over the Telephone!", NTT Review, (1995), pp. 104–109.

* cited by examiner

Primary Examiner—William Trost
Assistant Examiner—Rafael Perez-Gutierrez
(74) Attorney, Agent, or Firm—Schiff Hardin & Waite

(57) ABSTRACT

A speech coder/decoder can select a broadband and a narrowband speech coding method. For a connection to a mobile station, a monitoring of transmission possibilities is performed, and, given limited transmission possibilities, there is a changeover from broadband to narrowband speech coding methods. The received narrowband speech information is expanded to a greater bandwidth at the receive side. The subjective speech impression is improved by the bridging of this changeover effect. This guarantees an improved speech quality to the listener, particularly with the introduction of adaptive multirate coding.

17 Claims, 5 Drawing Sheets

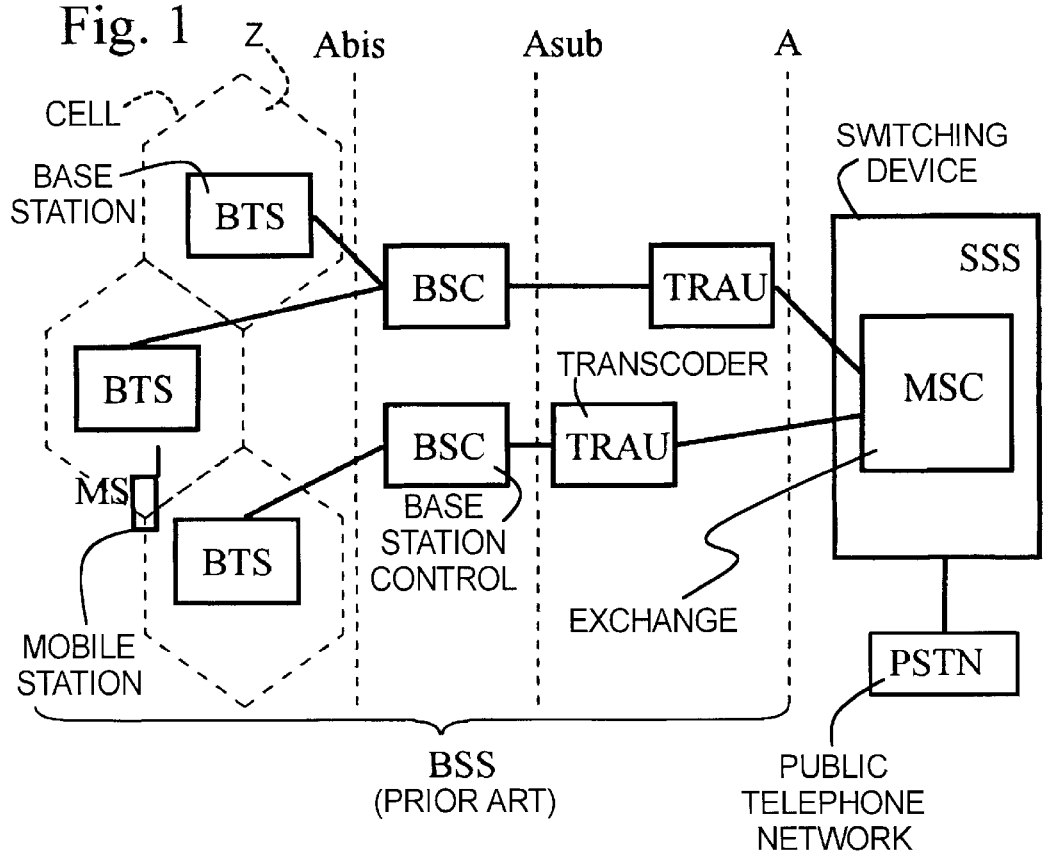
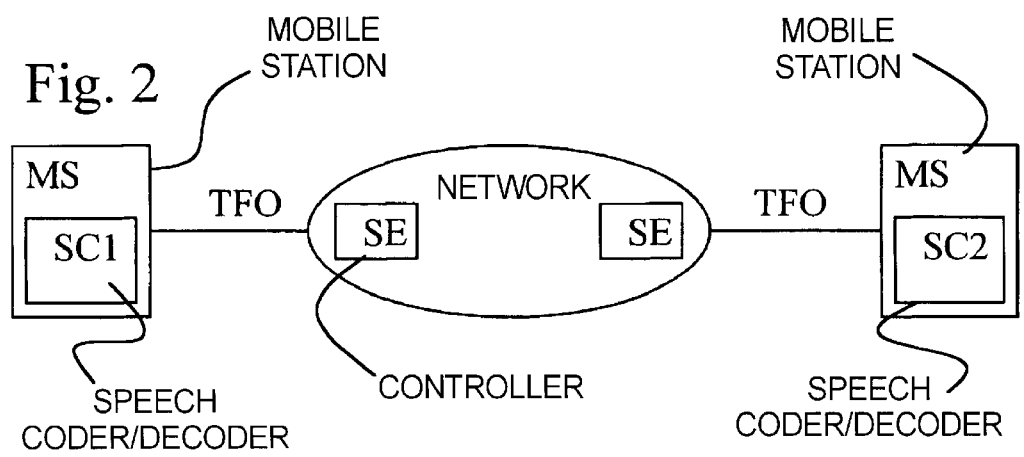

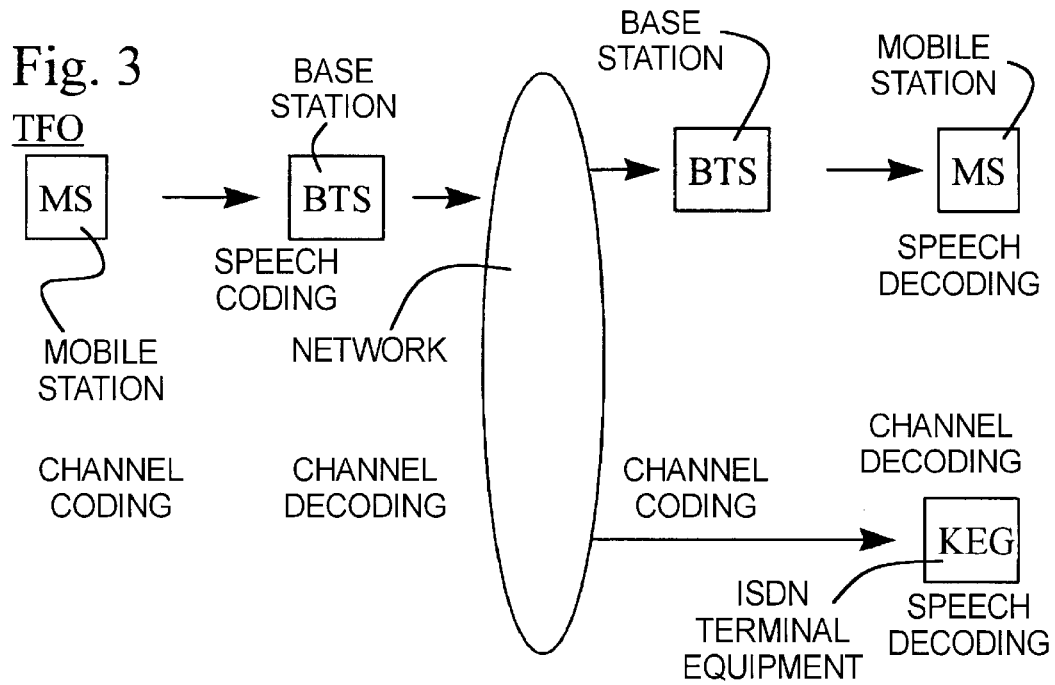
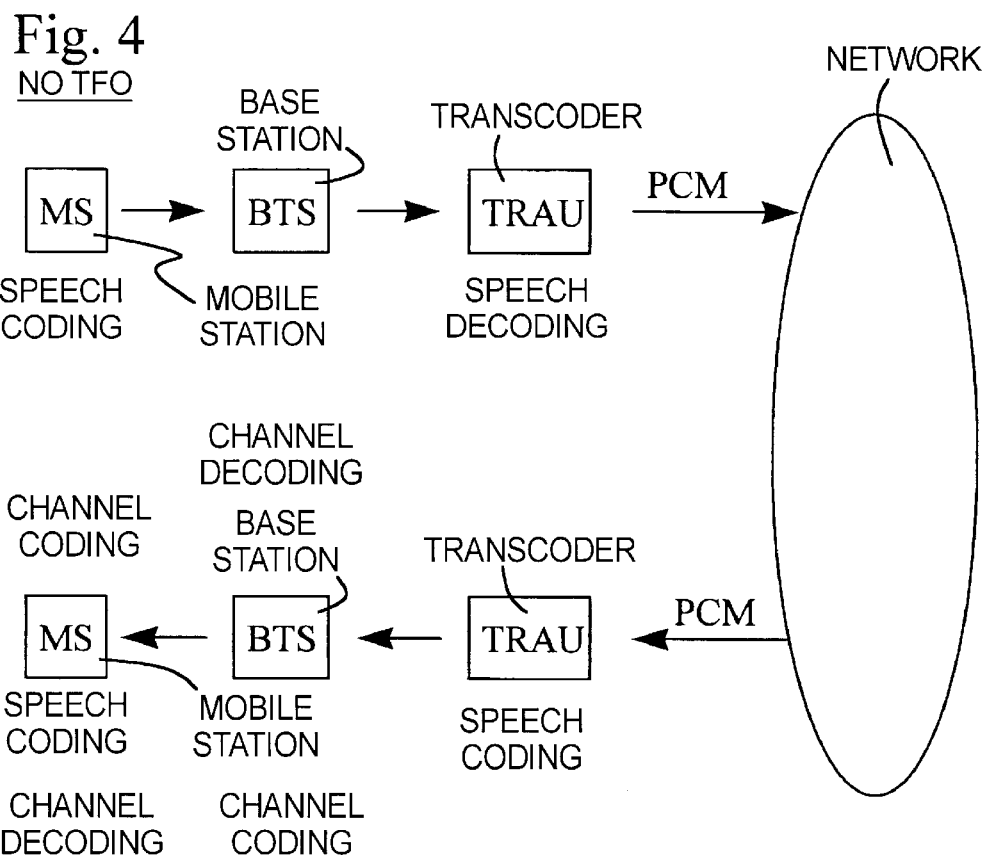

f1 = 50..300 Hz
f2 = 300..3,4 kHz
f3 = 3,4..7 kHz
f1-f3 = 50 Hz .. 7 kHz

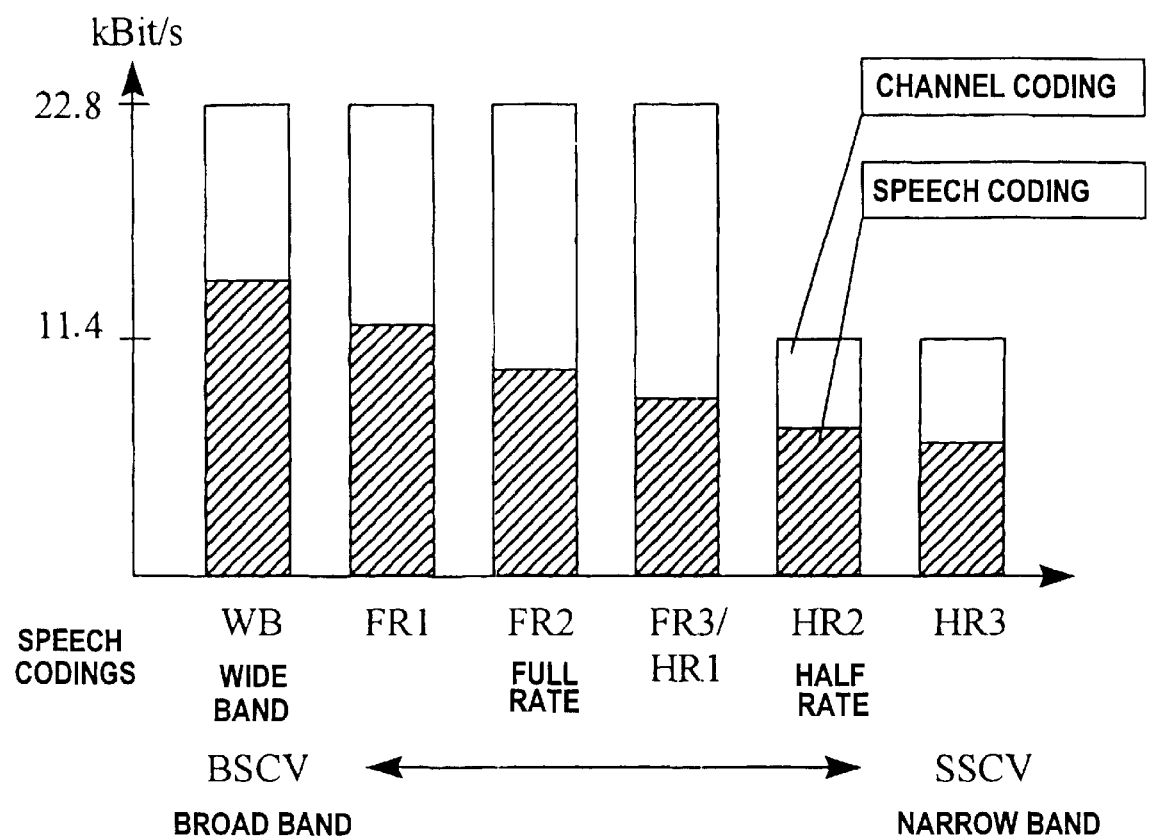

METHOD AND RADIO COMMUNICATION SYSTEM FOR TRANSMITTING SPEECH INFORMATION USING A BROADBAND OR A NARROWBAND SPEECH CODING METHOD DEPENDING ON TRANSMISSION POSSIBILITIES

BACKGROUND OF THE INVENTION

The invention relates to a method and a radio communication system for transmitting speech information.

The cellular mobile radio system GSM (Global System for Mobile Communication) is an example of a radio communication system. In this system, the multiple access method TDMA (Time Division Multiple Access) is used, whereby mobile stations are distinguished by different time slots of a time division multiplex system.

FIG. 1 depicts a block diagram of such a mobile radio network whose service area is divided into a plurality of cells Z. In a cell Z, the telecommunication service from and to a mobile station MS is made available by a base station BTS. One or more base stations BTS are connected to a base station control BSC. The base station control BSC executes the local functions of the call switching, monitoring, and maintenance. The adaptation of the data of the mobile radio network to a telephone network is performed by a transcoder unit TRAU.

The totality of the base stations BTS, the base station control BSC, and the transcoder unit TRAU is referenced as a base station system BSS. A plurality of base station controls BSC are connected to an exchange MSC, which is a constituent of a switching means SSS which is connected to a public telephone network PSTN. The telephone network PSTN can be constructed as an ISDN network, as another mobile radio network, or as another kind of telephone or data network. The interface between base station BTS and base station control BSC is referenced as an Abis interface, and the interface between base station control BSC and transcoder unit TRAU is referenced as an Asub interface. The transmission occurs in wire-bound fashion via a PCM24 or a PCM30 link.

In a transmission of speech to or from a mobile station, it is generally known to sample analog speech information on the transmit side and to convert this into digitally coded speech information in a speech coder, and to transmit this error-protected, as warranted. On the receive side, the digitally coded speech information is converted back into analog speech information.

In the above-mentioned mobile radio network GSM, which serves below only to illustrate the technical background of the present invention without restricting the generality of its use, the transcoder unit TRAU executes the adjustment of the data rate which is communicated by the telephone network PSTN to the data rate specified in the mobile radio network, (see German reference DE 196 47 630). A speech coding is executed not only in the mobile station MS, but also in the transcoder unit TRAU. A channel coding is typically executed for a radio transmission between mobile station MS and base station BTS.

With the introduction of radio communication systems of the third generation (UMTS), it is provided that speech information should be transmittable broadband beyond the bandwidths from 300 Hz to 3.4 kHz, which are typical in telephone technology. The previously employed narrowband transmission should thus be replaced, and the speech quality improved. In previous narrowband transmission methods, it is taught in the reference "More Natural Sounding Voice Quality Over the Telephone" (M. Abe and Y. Yoshide, NTT Review, Vol. 7, Nr. 3, May 1995:104–109) to execute an artificial bandwidth expansion on the receive side, in order to imitate a natural speech sound. This described bandwidth expansion is applied continuously and should be independent of the conditions of the terminal equipment (see p. 105, bottom, to p. 106, top).

SUMMARY OF THE INVENTION

It is an object of the present invention to provide a method and radio communication system for transmitting speech information which can correspond to the variable transmission conditions with respect to the speech coding/decoding.

The inventive method for transmitting speech information in a radio communication system presupposes speech coder/decoders, which are arranged in a mobile station, or respectively, in a transcoder unit. By means of the coder/decoders at least one broadband and one narrowband speech coding method can be selected. Furthermore, for a connection to the mobile station, a monitoring of transmission possibilities is executed, and given limited transmission possibilities, a switchover is executed from the broadband to the narrowband speech coding method. That is, the speech information is transmitted narrowband via at least parts of a transmission channel between the speech coder/decoders. The broadband speech coding method requires a high net data rate, which no longer exists with sufficient error protection under these transmission conditions.

A narrowband speech coding method leads to a different speech perception at the receive side, however, whereby the changeover, in particular, leads to undesirable and disruptive sound alterations. The received narrowband speech information is inventively expanded to a greater bandwidth at the receive side. The subjective speech impression improves by means of the bridging of this changeover effect. This applies particularly to short changeover phases from broadband to narrowband speech coding methods.

According to an advantageous development of the present invention, the selected narrowband speech coding method provides a higher coding protection than the broadband speech coding method. Thus, in the case of temporary signal interruptions, which are frequent in radio communication systems, the transmission is guaranteed, and the previously perceived subjective speech impression is maintained at the listener.

According to other advantageous embodiments of the present invention, there are reactions to limitations of the transmission possibilities, which limitations are brought about, via the radio interface, by an at least partial failure of a previously used tandem free operation (TFO) mode or by poor transmission conditions. The limited transmission possibilities can also arise due to a changeover to another data rate (for example, half-rate), which is necessary due to the capacity utilization of system resources. In all these cases, the inventive method creates an improved subjective speech impression.

The speech coding for the connection is advantageously executed in a TFO mode, and the changeover is thus executed for both devices taking part in the connection, whether it be a mobile station, another terminal equipment, or a transcoder unit. The TFO mode replaces a speech coding/decoding at the network side, in the transcoder unit TRAU, for example, by a transparent transmission of the speech-encoded speech information from terminal equipment to terminal equipment. Due to the transparency of the TFO mode, given transmission disturbances, an adaptation must also occur for both transmissions. However, it is just as possible that a failure of the TFO module represents the disturbance and that there must be a changeover to a PCM transmission at the network side. The inventive method leads to an improved speech impression in the changeover phase in this case also.

Another frequently occurring disturbing influence is a handover process during the TFO mode. The TFO mode is then potentially temporarily interrupted, and there is a changeover to a narrowband speech coding until the TFO mode is reestablished.

If the interference lasts longer, for example, longer than 5 s, then it is advantageous to gradually reduce the bandwidth expansion of the received narrowband speech information. The transition is thus smoothed for a subsequent narrowband transmission. The bandwidth expansion can be gradually reduced or can be suppressed by digital filtering. These adjustments can be executed according to the individual receiver.

According to an advantageous embodiment of the present invention, the speech coder/decoder is subdivided into modules for at least two frequency ranges, so that the broadband, or respectively, narrowband speech coding method can be specified by the selection of one or more modules. These modules are easy to add, or respectively, remove, so that the speech coder/decoder can be adapted to the transmission conditions by simple parametrization.

It also is within the framework of the present invention that the speech coder/decoder provides two broadband speech coding methods (i.e., the bandwidth is greater than 300 Hz to 3.4 kHz), the more narrowband of the two speech coding methods being more sharply limited in the higher frequency range. But an addition of the lower frequencies already improves the sound perception. This also has the advantage that e.g. 50 Hz to 3.4 kHz can be transmitted PCM-encoded. The higher frequencies are additionally artificially generated in a bandwidth expansion.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a mobile radio network;

FIG. 2 depicts speech transmission via a mobile radio network;

FIG. 3 depicts speech transmission in the TFO mode;

FIG. 4 depicts speech transmission without the TFO mode;

FIG. 8 depicts various transmission methods for speech information.

DESCRIPTION OF THE PREFERRED EMBODIMENTS

Figure 5:
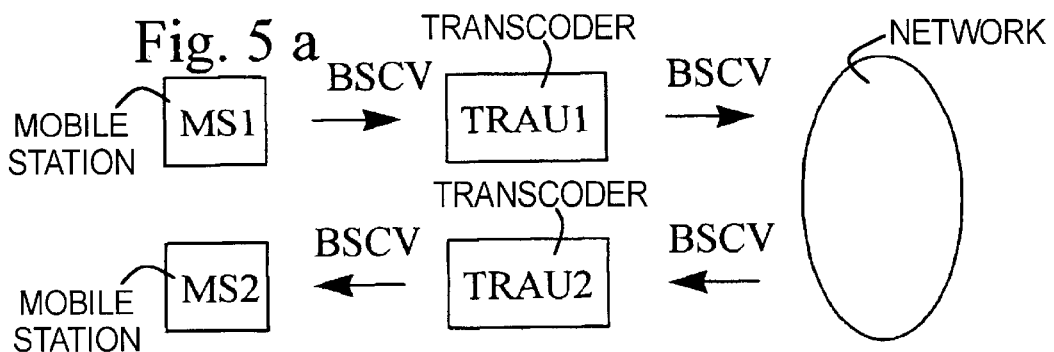
FIGS. 5a–5d depict different possibilities for a utilization of the inventive method.
Figure 5:
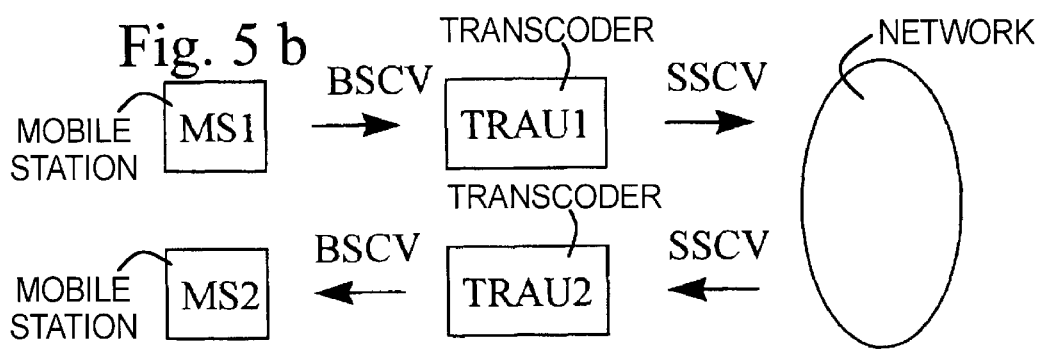
Figure 5:
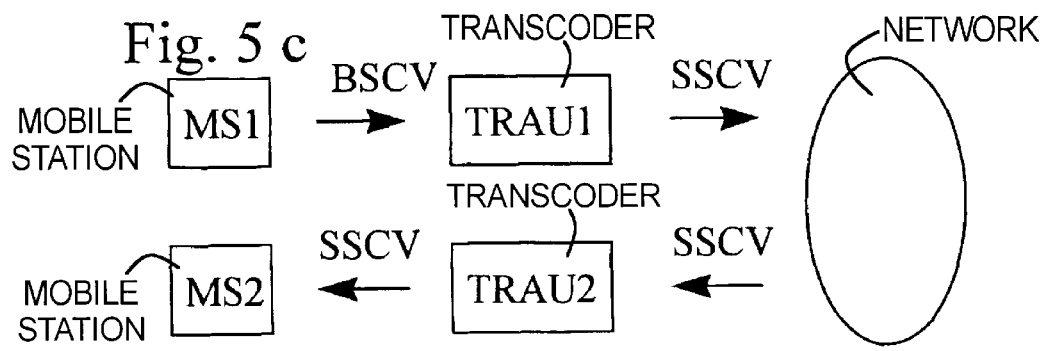
Figure 5:
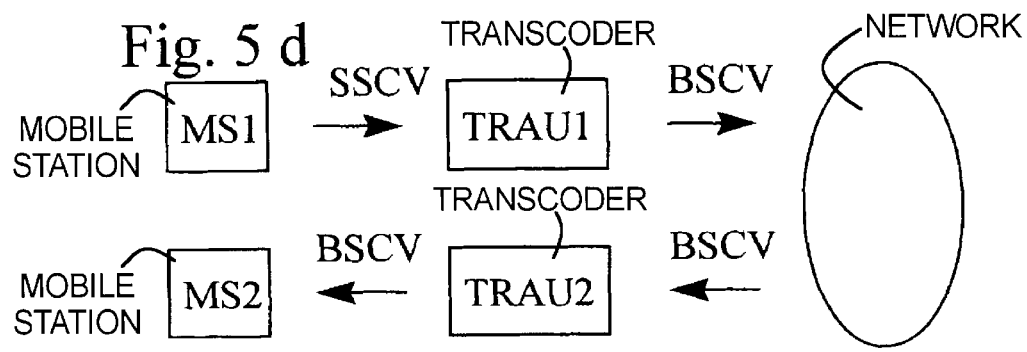

The mobile radio network that is depicted in FIG. 1 and described above is a GSM mobile radio system (or a DCS-1800 and a PCS-1900 system), for example, via which the speech information and data can be transmitted from and to mobile radio subscribers (mobile stations MS). The present invention can also be utilized in radio communication systems of the third generation.

The functioning of the speech coding and decoding as well as of the speech transmission can be derived from the German Patent P 44 16 407. TRAU frames transport the speech-encoded speech information with a speech period of 20 msec.

FIG. 2 schematically depicts the speech transmission, via a mobile radio network, between two mobile stations MS with speech coder/decoders SC1, SC2. The speech coder/decoders SC1, SC2 contain modules, which are depicted below, for broadband and narrowband speech transmission, between which it is possible to switch. It is assumed that the broadband speech coding method BSCV is selected for a connection to a mobile station MS.

The broadband transmission of speech information occurs with a TFO mode. That is, a speech coding does not occur for the transmission in the network. Since the broadband speech coding method BSCV requires a higher sampling rate than a narrowband speech coding method SSCV, the broadband speech information can not be transmitted over the network PCM-encoded (G.711 A/$\mu$law, 8 kHz sampling rate). The TFO mode defines a separate transmission method in the network.

Control means SE which monitor the transmission possibilities are provided at the network side. These control means SE are integrated in the base station controls BSC, for example. The control means SE specifies parameters with respect to the transmission possibilities for a connection to a mobile station MS. By the comparison of these parameters, e.g., the comparison of the bit error rate with a threshold value, a degraded transmission quality for the radio interface between mobile station MS and base station BTS is detected.

An additional, or respectively, alternative functionality of the control means SE consists in the detection of interruptions in the TFO transmission, or of bottlenecks in the allocation of radio resources, or in the transmission, which are conditioned by handover processes. The transmission possibilities are also limited by these influences. If a changeover is necessary in a half-rate mode, then a narrowband speech coding method SSCV should likewise be selected.

FIG. 3 depicts a transmission direction of the speech transmission for the TFO mode, which is typically instanced as a duplex connection, in which a speech coding and a channel coding are executed in a mobile station MS prior to the transmission of the speech information to the base station BTS. In the base station BTS, a channel decoding takes place, whereupon the still speech-encoded speech information is switched over the network to a base station BTS for the other subscriber. There is a second mobile station MS located in the radio range of this base station BTS. The base station BTS executes the channel coding for the subsequent radio transmission, whereupon a channel decoding and a speech decoding is executed in the second mobile station MS. If the other subscriber is not a mobile station, but an ISDN terminal equipment KEG, for example, then a repeated channel coding/decoding is eliminated.

For a transmission without TFO mode (FIG. 4), a speech decoding is executed prior to a switching at the network side in the transcoder unit TRAU, and the speech information is transmitted PCM-coded. In the case of a mobile second subscriber, a corresponding speech coding is, in turn, executed in a transcoder unit TRAU subsequent to the switching.

FIG. 5a depicts the case of the TFO transmission with broadband speech coding BSCV from mobile station MS1 to mobile station MS2, whereby a repeated speech coding is not executed in the transcoder units TRAU1 and TRAU2.

If the TFO mode in the network fails, the scheme according to FIG. 5b results. Between the transcoder units TRAU1 and TRAU2, the speech transmission occurs narrowband. For the transmission direction depicted in FIG. 5b, the broadband speech information is reduced in bandwidth in the transcoder unit TRAU1, and subsequent to the narrowband transmission, the bandwidth expansion occurs in the transcoder unit TRAU2, the mobile station MS2 thus receiving broadband speech information already. The bandwidth reduction, or respectively, expansion can also be initiated gradually, however.

Given a longer lasting failure of the TFO mode, the bandwidth expansion can be gradually reduced in the transcoder unit TRAU2, and there can ultimately be a changeover, onto another broadband speech coding method BSCV with a narrower band, between mobile station MS1 and transcoder unit TRAU1 and/or between mobile station MS2 and transcoder unit TRAU2. This second broadband speech coding method BSCV, which has a narrower band, advantageously has an expanded frequency range into the low frequencies. That is, with this specific broadband speech coding method BSCV, speech information can be transmitted over existing networks PCM-coded according to G.711. A reduction of the changeover interference already arises if a repeated bandwidth expansion is not executed in the transcoder unit TRAU2.

If the transmission conditions for the radio interface deteriorate, then the transmission occurs between mobile station MS1 and transcoder unit TRAU1 (according to FIG. 5d), or respectively, between transcoder unit TRAU2 and mobile station MS2 (according to FIG. 5c), according to a narrowband speech coding method SSCV. The bandwidth expansion respectively occurs at the receiving end of the part of the transmission channel with limited transmission possibilities. Assuming the situation in FIG. 5c, the narrowband transmission can additionally include the transmission between the transcoder units TRAU1 and TRAU2 and ultimately also from the transcoder unit TRAU2 to the mobile station MS2. The changeover according to FIG. 5d is usually immediately connected to a changeover between the transcoder units TRAU1 and TRAU2 to a narrowband transcoding method SSCV. The bandwidth expansion would thus occur either in the transcoding unit TRAU2 or even in the mobile station MS2.

Figure 6:
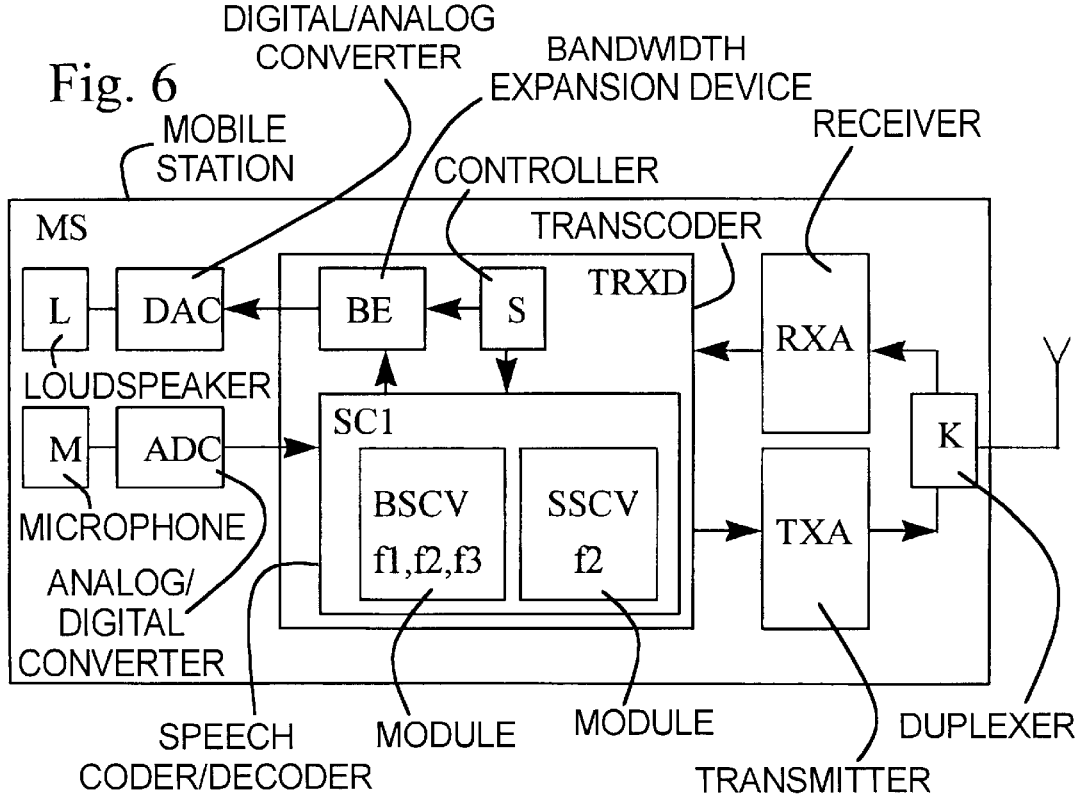
FIG. 6 depicts a mobile station.

FIG. 6 depicts an inventive mobile station MS. It contains a loudspeaker L, a digital/analog converter DAC, a microphone M, and an analog/digital converter ADC. By means of these subassemblies L, M, ADC, DAC, the speech input/output is connected to a digital part TRXD, which, in addition to executing a baseband processing (not depicted), executes a speech coding/decoding. To this end, the digital part TRXD contains a speech coder/decoder SCI, which readies modules BSCV, SSCV for broadband, or respectively, narrowband speech coding/decoding, between which it is possible to switch. A subassembly of the transcoder unit TRAU, TRAU1, TRAU2 corresponds to the digital part TRXD and executes a speech coding/decoding.

The following considers only the reception, that is, the decoding, for the mobile station MS. Three modules are provided for the broadband speech decoding BSCV, these covering the frequency ranges f1=50 Hz to 300 Hz, f2=300 Hz to 3.4 kHz, and f3=3.4 kHz to 7 kHz. For the narrowband speech decoding SSCV, only one module f2=300 Hz to 3.4 kHz is required. A more narrowband broadband transmission is likewise possible if only the modules f1 and f2 are used. The speech coder/decoder SC1 also contains a means BE for bandwidth expansion and a control S. Their functions are detailed with reference to FIG. 7.

The digital part TRXD is connected to analog receiving means RXA and transmitting means TXA, which are in turn connected to an antenna via a duplexer K. In the receiving means RXA and the transmitting means TXA, an amplification, filtering and mixing of the receive and transmit signals are executed.

Figure 7:
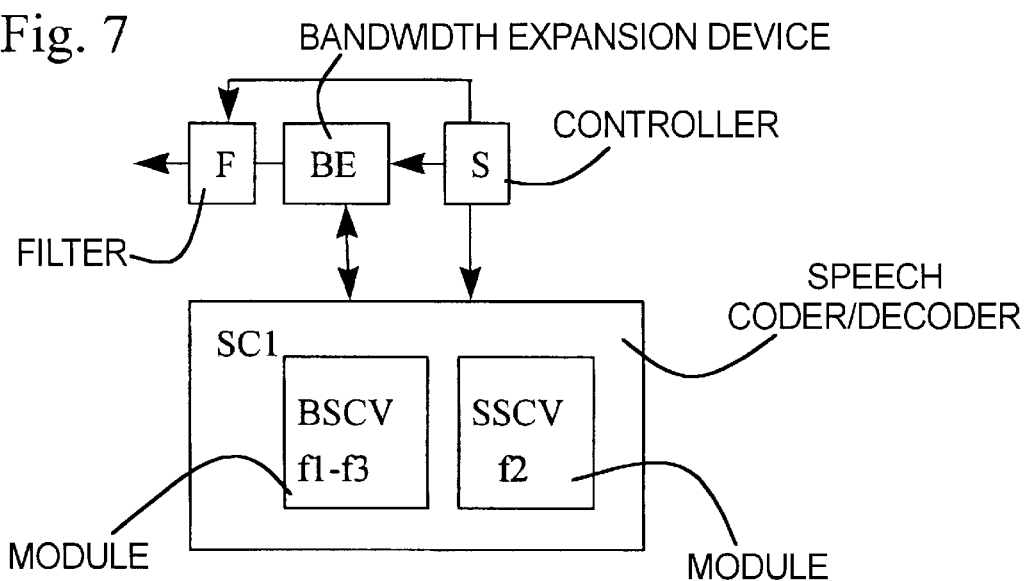
FIG. 7 depicts speech coder/decoder with a plurality of coding methods.

In the speech decoder SC1 according to FIG. 7, a broadband expansion is executed in the means BE in the course of (that is, before, during, or after) a speech decoding of narrowband speech information, whereby an algorithm is used from the reference "More Natural Sounding Voice Quality Over the Telephone" (M. Abe and Y. Yoshide, NTT Review; Vol. 7; No. 3, May 1995: 104–109), for example. The same applies to the opposite transmission direction.

Subsequent to the bandwidth expansion, a filtering in a digital filter F is performed, which gradually returns the bandwidth expansion to the bandwidth of the narrowband transmission. This is an option which is used given longer limitations of the transmission possibilities, and can also be replaced by an adaptation within the bandwidth expansion algorithm.

The changeover between broadband and narrowband transmission is triggered by the control S, which evaluates the transmission possibilities and parameters of the transmission conditions, or respectively, which is prompted to do this by a signalling at the network side. The control S also effects the adjustment of the band expansion algorithm, or respectively, the parametrization of the digital filter F. A selection of the modules f1, f2, f3 for the broadband BSCV and narrowband SSCV speech coding/decoding is also prompted by the control S.

Broadband and narrowband are relative terms which, according to FIG. 8, can be related to a multitude of different speech codings (see J. Biala, "Mobilfunk and intelligente Netze," Vieweg Verlag, 1995: 96–102), whereby, for the broadband transmission within the data rate of the radio interface of, for example, 22.8 or 11.4 kBit/s, a greater share should preferably be provided for the speech coding. From the combination of speech coding and channel coding, different ratios of protective bits to useful bits, that is, different coding protections, arise for the data rates of 22.8 or 11.4. Given the same gross data rate, a narrowband method is more resistant to interference and is chosen given poor transmission conditions.

For short-term interferences, for example, given radio shadow effects or temporary failure of the TFO mode by handover, and in order to maintain the sound impression of the broadband transmission at the listener the bandwidth expansion of the speech information that is received, narrowband only, subsequent to the changeover is executed. Given longer disturbances, the bandwidth expansion is gradually reduced to the bandwidth of the narrowband transmission. Particularly with the introduction of adaptive multirate coders (AMR), this guarantees an improved speech quality to the listener, which is also effective in mobile radio, with its rapidly changing channel conditions.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A radio communication system for transmitting speech information, comprising:
   mobile stations, each having a first speech coder/decoder;
   at least one transcoder unit having a second speech coder/decoder;
   at least one broadband speech coding method and one narrowband speech coding method that are selectable, at least by one of the first and second speech coder/decoders;
   a control device for monitoring transmission possibilities for a transmission channel between the first and second speech coder/decoders;
   given limited transmission possibilities for at least parts of the transmission channel, a changeover being effected from broadband to narrowband speech coding methods; and
   a device for bandwidth expansion which expands transmitted narrowband speech information to a larger bandwidth, wherein the selected narrowband speech coding method provides a higher level of coding protection than a level of coding protection of the broadband speech coding method.

2. The radio communication system according to claim 1, wherein the device for bandwidth expansion is arranged in at least one of the mobile station and the transcoder unit.

3. The radio communication system according to claim 1, wherein a filter is allocated to the device for bandwidth expansion.

4. A method for transmitting speech information in a radio communication system having at least two speech coder/decoders which are arranged in mobile stations, or respectively, at a network side and separated by a transmission channel, comprising the steps of:
   selecting at least one broadband speech coding method and one narrowband speech coding method by a speech coder/decoder;
   monitoring transmission possibilities for a connection to a mobile station;
   changing over, given limited transmission possibilities for at least parts of the transmission channel, from the broadband speech coding method to the narrowband speech coding method;
   transmitting speech information with the narrowband speech coding method; and
   expanding the transmitted narrowband speech information to a larger bandwidth, wherein the selected narrowband speech coding method provides a higher level of coding protection than a level of coding protection of the broadband speech coding method.

5. The method according to claim 4, wherein parts of the transmission channel with limited transmission possibilities relate to radio interface, and wherein the transmission possibilities are limited by one of deteriorated transmission conditions or a changeover onto another data rate by system resources.

6. The method according to claim 4, wherein at least one speech coder/decoder is subdivided into modules for at least two frequency ranges, and wherein the broadband, or respectively, narrowband speech coding method is specified by selection of at least one of said modules.

7. The method according to claim 4, wherein the speech coder/decoder provides two broadband speech coding methods, a more narrowband speech coding method of the two broadband speech coding methods being more sharply limited in a higher frequency range.

8. The method according to claim 7, wherein the more narrowband of the two broadband speech coding methods is limited with respect to frequency such that speech information is transmitted PCM-coded.

9. The method according to claim 4, wherein a tandem free operation (TFO) mode is used for at least parts of the transmission channel, and wherein the limited transmission possibilities arise due to an at least partial failure of the TFO mode.

10. The method according to claim 4, wherein the selection of the speech coding method and the bandwidth expansion of the received narrowband speech information are initiated in response to rapidly changing transmission possibilities.

11. The method according to claim 4, wherein the changeover is executed for both mobile stations and ISDN terminal equipment affected by the limited transmission possibilities of the transmission channel of the connection.

12. The method according to claim 4, wherein the selection of the speech coding method and the bandwidth expansion of the received narrowband speech information are initiated in response to a handover process.

13. The method according to claim 4, wherein the bandwidth expansion of the received narrowband speech information is gradually reduced.

14. The method according to claim 13, wherein the bandwidth expansion is reduced to a bandwidth of the narrowband speech information.

15. The method according to claim 4, wherein the bandwidth expansion occurs in one of a mobile station or a transcoder unit.

16. The method according to claim 4, wherein the bandwidth is reduced at a receive side by digital filtering.

17. The method according to claim 16, wherein the bandwidth expansion is reduced to a bandwidth of the narrowband speech information.

* * * * *